United States Patent
Krüger et al.

(10) Patent No.: US 8,573,037 B2
(45) Date of Patent: Nov. 5, 2013

(54) METHOD FOR DETERMINING EMISSION VALUES OF A GAS TURBINE, AND APPARATUS FOR CARRYING OUT SAID METHOD

(75) Inventors: Dietmar Krüger, Dinslaken (DE); Thomas Schimanski, Herne (DE); Dirk Koch, Wuppettal (DE)

(73) Assignee: MAN Diesel & Turbo SE, Oberhausen (DE)

( * ) Notice: Subject to any disclaimer, the term of this patent is extended or adjusted under 35 U.S.C. 154(b) by 0 days.

(21) Appl. No.: 13/552,922

(22) Filed: Jul. 19, 2012

(65) Prior Publication Data

US 2012/0279289 A1    Nov. 8, 2012

Related U.S. Application Data

(63) Continuation of application No. 12/670,884, filed on Jan. 27, 2010, now abandoned.

(30) Foreign Application Priority Data

Aug. 1, 2007   (DE) .................. 10 2007 036 084

(51) Int. Cl.
    *G01M 15/14*    (2006.01)
(52) U.S. Cl.
    USPC ........................................ 73/112.01
(58) Field of Classification Search
    USPC ................ 73/112.01, 112.03, 112.05
    See application file for complete search history.

(56) References Cited

U.S. PATENT DOCUMENTS

| | | | |
|---|---|---|---|
| 5,703,777 A | 12/1997 | Buchhop | |
| 6,230,103 B1 * | 5/2001 | DeCorso et al. | 702/23 |
| 7,578,177 B2 * | 8/2009 | Bunce | 73/112.01 |
| 2003/0191575 A1 | 10/2003 | Wright | |
| 2003/0216855 A1 | 11/2003 | Liang et al. | |
| 2008/0282770 A1 * | 11/2008 | Bunce | 73/23.31 |
| 2009/0056413 A1 * | 3/2009 | Rao et al. | 73/23.31 |

FOREIGN PATENT DOCUMENTS

| | | |
|---|---|---|
| DE | 10 2004 062 406 | 7/2006 |
| DE | 10 2007 002 752 | 11/2007 |
| EP | 1 693 558 | 8/2006 |
| EP | 2 177 741 | 4/2010 |
| EP | 2 372 142 | 10/2011 |
| WO | WO 2004/057164 | 7/2004 |

* cited by examiner

*Primary Examiner* — Eric S McCall
(74) *Attorney, Agent, or Firm* — Cozen O'Connor

(57) ABSTRACT

A method of determining emission values of a gas turbine, includes the following steps: a test run is performed on the gas turbine; operational parameters of the gas turbine are determined during the test run; first emission values are determined during the test run; an association between the operational parameters and the first emission values is stored; and during operation, operational parameters of the gas turbine are determined; and second emission values are determined in accordance with the stored association between the operational parameters and the first emission values.

20 Claims, No Drawings

METHOD FOR DETERMINING EMISSION VALUES OF A GAS TURBINE, AND APPARATUS FOR CARRYING OUT SAID METHOD

CROSS REFERENCE TO RELATED APPLICATIONS

This is a continuation application of U.S. Ser. No. 12/670,884, which was filed with the U.S. Patent and Trademark Office on Jan. 27, 2010—now abandoned which is a U.S. national stage of application No. PCT/EP2008/006247, filed on Jul. 29, 2008. Priority is claimed on the following application: Country: Germany, Application No.: 10 2007 036 084.5, Filed: Aug. 1, 2007, the content of which is/are incorporated here by reference.

BACKGROUND OF THE INVENTION

1. Field of the Invention

The present invention is directed to a method for determining emission values of a gas turbine and to a device for carrying out such a method.

2. Background of the Invention

Determining emission values in gas turbines during operation is gaining in importance as the monitoring of emissions by operators, inspection authorities and the like becomes increasingly important. On one hand, gas turbines should be operated with the lowest possible emissions, which requires determination of the emission values of the gas turbine continuously or discretely, e.g., periodically or by spot check. On the other hand, adverse operating conditions of the gas turbine can be detected at an early stage on the basis of these emission values.

To this end, it was known previously in in-house practice to determine the emission values by means of additional in-house measuring instruments. However, this increases production costs and maintenance costs for the gas turbines. Further, the necessity of arranging measuring instruments at suitable locations hampers flexibility in designing the gas turbine and the associated machinery. Further, because the measuring instruments are preferably arranged in the hot exhaust gas flow of the gas turbine, they are highly stressed by environmental conditions, which likewise necessitates expensive constructions and more frequent replacement of measuring instruments.

Therefore, it is already known alternatively to calculate the emission values using a mathematical substitution model of the gas turbine based on operating parameters such as speed or the like. However, this calculation based on a substitution model is necessarily imprecise because of the necessary simplifications arising from modeling, the uncertainties in the model parameters, and the like, and also requires relatively elaborate resources for modeling new types of gas turbine and calibrating the model parameters.

SUMMARY OF THE INVENTION

Therefore, the object of the present invention is to make it possible to determine emission values of a gas turbine in a simple and precise manner.

Before starting up or restarting a gas turbine, a test run of the gas turbine is generally carried out by the manufacturer or on site in order to check functionality, structural component parts, and the like. According to the invention, operating parameters of the gas turbine and first emission values are determined during a test run of this kind which is carried out in any case before putting the gas turbine into operation. This determination can be carried out directly, for example, by measuring individual operating parameters or first emission values, or also indirectly, for example, by measuring operating parameters and converting these parameters into other operating parameters.

Thermodynamic relationships exist between the operating parameters determined during the test run and first emission values. For example, the amount of nitrogen oxides NOx increases or decreases at certain temperatures or combustion levels in the gas turbine. Therefore, according to the present invention, an association or correlation between the operating parameters determined during the test run and first emission values is stored. This may be carried out, for example, in the form of an operating map by associating a first emission value with one or more operating parameters. For operating parameter values between the values stored in the operating maps, the first emission values can be linearly interpolated, for example. It is also possible to approximate the correlation between operating parameters and first emission values by means of an approximation function, for example, a polynomial function, an exponential function, a trigonometric series, partially defined cubic splines, or the like, and to store only this function, i.e., the coefficients of a polynomial, for example.

Operating parameters of the gas turbine are determined again during operation. These may conform partially or wholly to the operating parameters determined during the test run. As will be explained in the following, it is also possible to use additional or different operating parameters. Those operating parameters that are determined anyway for monitoring, controlling or regulating the gas turbine, i.e., directly measured or calculated indirectly from other operating parameters, are preferably determined during operation and/or during the test run for determining emission values. In an advantageous manner, this further reduces the resources required for determining emission values according to the invention.

According to the present invention, second emission values of the gas turbine which characterize the emission behavior of the gas turbine at the current operating point are then determined based on the operating parameters determined during operation and on the stored correlation between operating parameters and first emission values. For this purpose, for example, the operating parameters determined during operation can be used in a function which is stored as a correlation between operating parameters and first emission values. When the correlation is stored, for example, in the form of an operating map, the first emission values associated with the operating parameters determined during operation can be read out from the operating map and interpolated.

The first emission values resulting in accordance with the correlation for the operating parameters determined during operation can be identical to the second emission values characterizing the emission behavior of the gas turbine during operation. The first emission values, particularly operating parameters determined in a corresponding manner during operation, can also be converted into second emission values as will be explained in more detail in the following.

In gas turbines, a gas turbine temperature, for example, the temperature of a medium flowing through the gas turbine, at the input of a low-pressure stage or high-pressure stage is often used as a monitoring variable and controlled variable for limiting regulation or to show given load levels of the gas turbine. For this purpose, a gas turbine temperature of this kind is acquired and compared with a given or variable reference value. Control quantities for a guide vane system, a fuel supply, the opening of a bypass valve, or the like, are then determined according to a given control principle from the difference between these two values.

According to in-house practice, a gas turbine temperature of the kind mentioned above can be corrected corresponding to the ambient temperature by placing it in a functional relationship T4*(T4, T0) with the ambient temperature.

Since this measured gas turbine temperature or this gas turbine temperature corrected in accordance with the ambient temperature is determined during operation anyway and is generally proportional to a load level that has just been reached by the gas turbine, this operating parameter is particularly suitable for determining emission values according to the invention.

In a preferred embodiment of the present invention, the first emission values comprise specific emission values, i.e., values which are scaled to a defined exhaust gas volume flow or exhaust gas mass flow. This makes it possible to combine different operating states of the gas turbine in a lower-ranking operating map and to use simpler measuring instruments which only measure specific quantities. It has been shown that these specific emission values depend substantially on a corrected gas turbine temperature so that there is a particularly simple correlation between this one operating parameter and the specific first emission values, and this correlation can be acquired in a simple, precise manner during the test run and stored with little effort.

Often, however, interest is centered on absolute values, i.e., the absolute mass or absolute volume of exhaust gases, rather than on specific emission values. Therefore, in a preferred embodiment of the present invention, an emission value determined on the basis of the correlation between operating parameters and specific first emission values is multiplied by the mass flow or volume flow of the exhaust gas.

For this purpose, the mass flow or volume flow of the exhaust gas can be measured directly. However, it is also possible in an advantageous manner to determine the exhaust gas mass flow indirectly from operating parameters, for example, the corrected gas generator speed, the ambient pressure, and the ambient temperature. To this end, an operating map in which the associated exhaust gas mass flow is stored in discrete pairs of corrected gas generator speed and ambient temperature can be calculated for a determined type of gas turbine.

In a preferred embodiment, the total amount of nitrogen oxides NOx per time unit is determined as second emission value.

Usually, the pressure of the supplied air or of the occurring exhaust gas is also measured during the operation of gas turbines. Therefore, taking into account the specific volume or density of the exhaust gas at a certain pressure, the exhaust gas volume flow can also be determined in a simple manner from the exhaust gas mass flow by dividing by the density associated with the measured pressure.

Inspection records, testing regulations of inspection authorities, or the like, often specify determined standardized emission values for operation. In Germany, for example, it is required to indicate emission values for 15% oxygen in dry exhaust gas.

First emission values are advantageously determined during the test run with respect to standard values, for example, an oxygen content of 15% in dry exhaust gas. This determination of first emission values permits a simple determination of the emission characteristic of the gas turbine in operation while taking into account the boundary conditions prescribed by testing protocols, or the like.

The emission values of a gas turbine change particularly corresponding to the actually occurring load level. Therefore, different load levels of the gas turbine are advantageously reached during the test run to determine the first emission values. As a rule, this is required anyway during a test run of the gas turbine in order to check for trouble-free functionality in all operating ranges and therefore does not give rise to additional costs. The stored correlation between operating parameters and first emission values is more precise the greater the discretization of the load levels, whereby the load level or the gas turbine temperature which is corrected in accordance with it is preferably used as an operating parameter.

Since the actual first emission values determined during a test run of the gas turbine are taken as a basis for the determination of emission values according to the invention, the emission values can be determined in operation in a simple, reliable and precise manner without the results being hampered by simplifications imposed by modeling or inaccuracies in the parameters. Also, the operating behavior of a gas turbine can change between the test run, which is usually carried out already by the gas turbine manufacturer, and the operation of the gas turbine that has been installed in a system. It has been shown that in this regard the correlation between operating parameters and emission values remains substantially the same qualitatively and only shifts by a constant offset. Therefore, in a preferred embodiment of the present invention, the stored correlation between the operating parameters and the first emission values of the gas turbine is calibrated one or more times at one or more operating points of the gas turbine. For this purpose, an actual emission value is determined at the operating point, or operating points, and is compared with the emission value yielded by the stored correlation. The correlation, i.e., a stored function or the values of a stored operating map, for example, is then multiplied by the quotient of the measured emission value and the emission value yielded by the correlation.

A device according to the present invention for implementing the method described above can be provided as a separate device for a gas turbine, and the first emission values and operating parameters are supplied to it. However, a device of this kind is preferably integrated in a control unit of the gas turbine in which the operating parameters and the first emission values are preferably at least partially present in any case. The correlation between operating parameters and first emission values can be recorded separately during the test run, evaluated and then stored in the device.

The emission values determined by the device during the operation of the gas turbine are advantageously displayed and/or stored corresponding to the respective procedure for inspection, testing or monitoring. This can be carried out, for example, continuously or at discrete times, for example, periodically or by spot check.

Further details, features and advantages of the present invention follow from the embodiment example described in the following.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

In a method according to an embodiment of the present invention, an exhaust gas mass flow operating map is first prepared for a particular gas turbine. The exhaust gas mass flow dm/dt in kg per hour is obtained by a model of the gas turbine depending on the respective load level (for example, 10%, 20%, . . . , 100%) and ambient temperature T0.

For the inspection of the gas turbine, a specific first emission value NOx is determined at a determined ambient temperature T0 for different load levels. To this end, the various load levels are run through prompted by determined reference values for a corrected gas turbine temperature T4 having a substantially linear relationship to the load levels. This corrected gas turbine temperature T4* is given by the temperature at the low-pressure inlet of the gas turbine T4 from which one half of the ambient temperature $0.5 \cdot T0$ is subtracted ($T4^*=T4-0.5 \cdot T0$). Other relationships (T4*(T4, T0) can also be used as a basis.

This specific emission value NOx is stored for the respective operating parameter in the form of the corrected gas turbine temperature T4* resulting finally in a correlation NOx (T4*) in the form of an operating map for the gas turbine. Since the gas turbine value T4* is corrected corresponding to the ambient temperature T0, this operating parameter need no longer be taken into account, resulting in a very simple correlation.

During operation, i.e., when the gas turbine is installed on site in the corresponding system, the above-mentioned correlation NOx(T4*) is calibrated once. For this purpose, the specific first emission value NOx is measured at a single operating point of the gas turbine characterized by a determined corrected gas turbine temperature T4*. Subsequently, all of the values in the operating map in which the correlation NOx(T4*) is stored are multiplied by the quotient of the specific first emission value NOx measured in operation and by the specific first emission value NOx which would result corresponding to the stored correlation. While doing this, and also during operation, a specific first emission value for a corrected gas turbine temperature T4* lying between two load levels initiated during the test run can be linearly interpolated.

After this calibration, a second emission value representing the amount of nitrogen oxides NOx per hour can be determined at selected times during the operation of the gas turbine. To this end, a specific first emission value NOx [mg/$m^3_{Norm}$] is determined from the stored and calibrated correlation NOx(T4*) for the corrected gas turbine temperature T4* which actually occurs in operation and which is determined in any event for purposes of regulation and supplied to the control arrangement. Aside from this, as was explained above, an exhaust gas mass flow is determined from this load level and the ambient temperature T0 in [kg/h] with reference to 15% oxygen in dry exhaust gas. The exhaust gas volume flow is multiplied by the first specific emission value NOx [mg/$m^3_{Norm}$] and, finally, supplies the amount of nitrogen oxides per hour NOx_15% $O_2$ dry exhaust as second emission value. This value can be determined periodically, for example, and stored in a monitoring log.

The invention is not limited by the embodiments described above which are presented as examples only but can be modified in various ways within the scope of protection defined by the appended patent claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed:

1. A method of determining emission values of a gas turbine comprising the steps of:
    (a) carrying out a test run of the gas turbine;
    (b) determining operating parameters of the gas turbine during the test run;
    (c) determining first emission values during the test run;
    (d) storing a correlation between the operating parameters and the first emission values;
    (e) determining during operation of the gas turbine operating parameters of the gas turbine; and
    (f) determining second emission values corresponding to the stored correlation between the operating parameters and the first emission values.

2. The method according to claim 1, wherein the operating parameters include one or more of an ambient temperature, a gas turbine temperature at the inlet or outlet of the gas turbine, a load level of the gas turbine, a speed of the gas turbine, an exhaust gas mass flow, an exhaust gas volume flow, a density and a pressure of one of the air supplied to the gas turbine and of the exhaust gas of the gas turbine.

3. The method according to claim 2, wherein the gas turbine temperature which is corrected in accordance with the ambient temperature, is used as an operating parameter.

4. The method according to claim 2, wherein one of an exhaust gas mass flow and an exhaust gas volume flow is determined during operation from operating parameters, and is used as an operating parameter.

5. The method according to claim 1, wherein the first emission values comprise specific emission values scaled to an exhaust gas volume flow or exhaust gas mass flow.

6. The method according to claim 1, wherein the first emission values are determined during the test run by measurement under standardized conditions.

7. The method according to claim 1, additionally comprising introducing during the test run different load levels of the gas turbine.

8. The method according to claim 1, additionally comprising the step of calibrating the stored correlation between the operating parameters and the first emission values at least once prior to operation.

9. A device for a gas turbine which is designed to carry out the method according to claim 1.

10. The device according to claim 9, comprising one of an output device for outputting the second emission values and a storage device for storing the second emission values.

11. The method of claim 2, wherein the operating parameter is the gas turbine temperature at the inlet or outlet of the low pressure or high pressure stage of the gas turbine.

12. The method of claim 3, wherein the gas turbine temperature is corrected by reducing the gas turbine temperature of one half of the ambient temperature.

13. The method of claim 4, wherein one of an exhaust gas mass flow and exhaust gas volume flow is determined from an operating map.

14. The method of claim 6, wherein the first emission values are determined by measurement under standardized conditions comprising one of a determined moisture content of the exhaust gas and a determined oxygen proportion in the exhaust gas.

15. The method of claim 14, wherein the oxygen content in the exhaust gas comprises an oxygen content of 15% in the dry state.

16. A method of determining emission values of a gas turbine comprising the steps of:
   (a) in a first process step, directly determining first emission values and first operating parameters of the gas turbine;
   (b) determining and storing a correlation between the first operating parameters and the first emission values;
   (c) in a second process step directly determining second operating parameters of the gas turbine;
   (d) indirectly determining second emission values by correlating the second operating step parameters determined in the second process step with the first operating parameters and first emission values determined and correlated in step (b); and wherein the first process step is performed during a test run prior to the intended operation of the gas turbine and the second process step is performed during the intended operation of the gas turbine.

17. The method according to claim 16, wherein the test run is performed at the manufacturer of the gas turbine.

18. The method according to claim 16, wherein the operating parameters include one or more of an ambient temperature, a gas turbine temperature at the inlet or outlet of the gas turbine, a load level of the gas turbine, a speed of the gas turbine, an exhaust gas mass flow, an exhaust gas volume flow, a density and a pressure of one of the air supplied to the gas turbine and of the exhaust gas of the gas turbine.

19. The method according to claim 16, wherein the gas turbine temperature which is corrected in accordance with the ambient temperature, is used as an operating parameter.

20. The method according to claim 16, wherein one of an exhaust gas mass flow and an exhaust gas volume flow is determined during operation from operating parameters, and is used as an operating parameter.

* * * * *

UNITED STATES PATENT AND TRADEMARK OFFICE
CERTIFICATE OF CORRECTION

PATENT NO. : 8,573,037 B2  
APPLICATION NO. : 13/552922  
DATED : November 5, 2013  
INVENTOR(S) : Dietmar Krüger et al.

Page 1 of 1

It is certified that error appears in the above-identified patent and that said Letters Patent is hereby corrected as shown below:

On the Title Page, Insert

--(87) PCT Filed: Jul. 29, 2008

(86) PCT No.: PCT/EP2008/006247

(87) PCT Pub. No.: WO/2009/015868

PCT Pub Date: Feb. 5, 2009--

Signed and Sealed this  
Twenty-third Day of June, 2015

Michelle K. Lee  
*Director of the United States Patent and Trademark Office*